(12) United States Patent
Hetzel et al.

(10) Patent No.: US 7,801,325 B1
(45) Date of Patent: Sep. 21, 2010

(54) WATERMARKING A CHIP DESIGN BASED ON FREQUENCY OF GEOMETRIC STRUCTURES

(75) Inventors: Asmus Hetzel, Berlin (DE); Ivan Q. Peyrot, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1057 days.

(21) Appl. No.: 11/478,290

(22) Filed: Jun. 29, 2006

Related U.S. Application Data

(60) Provisional application No. 60/757,741, filed on Jan. 9, 2006.

(51) Int. Cl.
*G06K 9/00* (2006.01)
*H04L 9/32* (2006.01)
(52) U.S. Cl. ........................... 382/100; 713/176
(58) Field of Classification Search ............... 382/100, 382/232, 240; 380/51, 54, 210, 252, 287; 370/522–529; 283/72, 74–81; 713/176, 713/179; 358/3.28
See application file for complete search history.

(56) References Cited

U.S. PATENT DOCUMENTS 6,889,326 B1 * 5/2005 Charbon et al. ............. 713/176
7,017,043 B1 * 3/2006 Potkonjak .................. 713/176

OTHER PUBLICATIONS

Kahng, et al., Robust IP Watermarking Methodologies for Physical Design; Proc. of the ACM/IEEE Design Automation Conference, 1998.
Caldwell, et al., Effective Iterative Techniques for Fingerprinting Design IP; 36th ACM/IEEE Design Automation Conference, Feb. 2004.
Charbon, et al., Watermarking Layout Topologies; Proc. IEEE Asia South-Pacific Design Automation Conference, 1999.
Charbon, et al., Hierarchical Watermarking in IC Design; Proc. IEEE Custom Integrated Circuits Conference, 1998.

(Continued)

*Primary Examiner*—Abolfazl Tabatabai
(74) *Attorney, Agent, or Firm*—Vista IP Law Group LLP

(57) ABSTRACT

A method for watermarking a circuit design layout based on frequency or number of geometric structures. The method includes dividing a circuit design layout into a plurality of segments or tiles. Certain segments are selected, and within these selected segments, a router alters the number of geometric structures, such as vias and jogs, of the circuit design layout in the selected segments to form the watermark without relying on a netlist. The number of geometric structures is changed slightly so that a random sampling of segments would not identify the watermark since the variations would not be detectable or would be within acceptable variances, but the watermark would be readily identified if the selected segments are known. The watermark or portions thereof can be used to encode one or more data bits.

49 Claims, 19 Drawing Sheets

OTHER PUBLICATIONS

Charbon, et al., Watermarking Techniques for Electronic Circuit Design; Lecture Notes on Computer Science, vol. 2613, 2003.

Nikolaidis, et al., Robust Image Watermarking in the Spatial Domain; Signal Processing, vol. 66, 1998.

Abdel-Hamid, et al., IP Watermarking Techniques, Survey and Comparison; Proc. of the 3rd IEEE International Workshop on System-on-Chip, 2003.

Nie, et al., A Watermarking System for IP Protection by a Post Layout Incremental Router; Proc. of the ACM/IEEE Design Automation Conference, 2005.

Hingston, Loughhead, Irwin; Topological Autorouting—Mapping the Changing Space; Altium; WP0101 (v.1.0); Jan. 2004.

VSI Alliance™ White Paper, "Intellectual Property Protection: Schemes, Alternatives and Discussion," Version 1.1 (IPWPI 1.1), Released Aug. 2002, Revision Jan. 8, 2001.

* cited by examiner

Segmentation 600

| | | | | | |
|---|---|---|---|---|---|
| X | X | Z | Z | Y | X |
| Z | Y | X | Y | Y | Z |
| X | Y | X | Y | Z | Z |
| Y | Y | Z | X | Y | Z |
| X | Z | X | Z | X | Y |
| Y | X | Y | X | Z | Z |

620 — (row 1, col 1)
610 — (row 1, col 6)
640 — (row 2, col 1)
630 — (row 4, col 1)
500 Circuit Design Layout

(One Bit)

(Three Bits)

(Circuit Design Layout with One Watermark)

(Circuit Design Layout with Multiple Watermarks)

1800

8 Marked Tiles
"0" Bit

8 Marked Tiles
4 Signed Tiles
"1" Bit

WATERMARKING A CHIP DESIGN BASED ON FREQUENCY OF GEOMETRIC STRUCTURES

CROSS-REFERENCE TO RELATED APPLICATION

The present application claims priority under 35 U.S.C. §119 of U.S. Provisional Application No. 60/757,741, filed Jan. 9, 2006, the contents of which are incorporated herein by reference.

FIELD OF THE INVENTION

The present invention relates generally to chip designs and, more particularly, to watermarking chip designs by altering the frequency or number of geometric circuit structures, such as vias and jogs.

BACKGROUND

Watermarks are well known marks that are imprinted on stationary, checks and the like in order to identify the manufacturer or validate products. A typical watermark is usually a semi-transparent symbol that is applied to the paper. Watermarking has expanded into digital applications to allow owners to manage who has rights to access and use certain technologies. For example, one form of electronic watermarking is to embed data into a music or video recording, and a computer or device that attempts to play it will determine whether a license to play the music or video exists based on the embedded data.

Another example of the expansion of digital watermarking is in Intellectual Property (IP) or IP core or building blocks that are used in Electronic Design Automation (EDA). IP is a block of logic or data that is used in making a field programmable gate array (FPGA) or an application-specific integrated circuit (ASIC). IP blocks or cores allow repeated use of previously designed components for use in EDA. Unauthorized copying and reuse IP by infringers, however, has become an increasingly significant problem, resulting in significant losses to IP creators.

Digital watermarking has been used to combat unauthorized IP reuse by implanting a digital signature, code or identifier at a particular level of the IP design. One known watermarking system involves use of a specific set of nets, net names, cell types, etc. as input to imprint a watermark. Algorithms that are used in these netlist-based techniques modify wiring of a specific set of nets to imprint a watermark. The secret key for encoding and decoding the watermark is the knowledge of the exact set of modified nets.

Such a system may be acceptable as long as the input design data remains unchanged. However, in practice, there is rarely a case when all of the necessary information regarding particular nets is available and the netlist remains constant to allow watermark detection. Further, netlist-based techniques may not be suitable in cases when chips are submitted to a foundry and only geometrical data, such as rectangular, octangular or polygonal metal shapes is available for checking the existence of a watermak, and there are no net names and no ordering of names. Further, determining which nets exist can be difficult.

Thus, netlist-based techniques are not desirable since they rely on a netlist that should not change, and the availability of exactly this netlist (including net names or a defined ordering of nets) when the watermark must be detected. Further, small modifications to netlists can cause this particular encoding/decoding system to fail. For example, adding just one new net can break the watermark in the sense that the detector cannot locate it. Thus, changes to netlists can cause system failure, which may be one reason why these types of techniques have not been satisfactorily used within commercial layout software. Thus, netlist-based hashing or fixed net ordering are not usable in various applications.

Other known techniques involve implanting codes in the structure of layout topologies using atomic blocks and bubbles, which are points associated with a given layer. A topology describes the relative position and orientation of object pairs. A watermark is generated from the set of all topological signatures derived from a design using atomic blocks and associated primitives or bubbles. More particularly, sequences of connections between two bubbles are converted into a canonical form by removing adjacent identical edges, which form loops. The canonical form of an arbitrary topological routing is a topological signature. A watermark is formed by computing topological signatures for all of the existing topological routings and combining them.

These known techniques, however require a topological routing system to be implemented in practice. Though such systems have been studied theoretically and experimentally, they have not been successfully commercially implemented for IC layout due to various underlying difficulties. For example, modern IC layouts require the routing machinery to handle an increasingly growing set of design rules. Many rules are geometric rules that disallow certain geometric configurations or patterns. Topological routing by nature abstracts the routing from the geometrical shape based level to the topological level, in which only the relative position of objects (wires, net pins, obstructions) to each other is considered rather than the precise location of the metal shapes that realize these objects. As a result, topological routers need a subsequent geometric embedding step that may often fail as the generated topology is not realizable when precise shape locations have to be determined. Such failures can occur often and may prevent generation of legal layout and render the topological routing ineffective. Consequently, watermarking IC layouts based on such topological properties is not desirable in practice.

Thus, there exists a need for a more effective watermarking system for chip designs that does not rely on netlists and that can be implemented by existing design systems using grid or shape based routing algorithms.

BRIEF DESCRIPTION OF THE DRAWINGS

FIG. 6 illustrates a circuit layout design divided into tiles or segments having different numbers of geometric structures;

FIG. 7 illustrates a circuit design layout divided into tiles or segments having the same number of geometric structures;

SUMMARY

Figure 1:
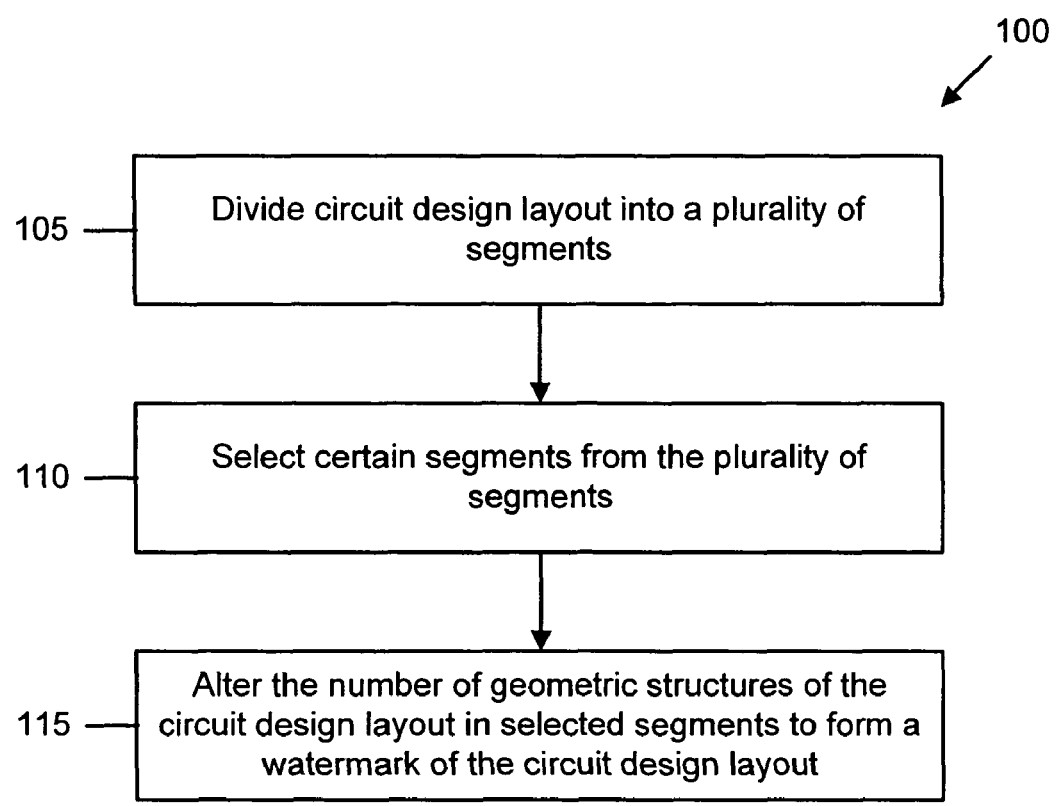
FIG. 1 is a flow chart illustrating a method of watermarking a circuit design layout according to one embodiment.

According to one embodiment, a method for watermarking a circuit design layout includes dividing a circuit design layout into a plurality of segments, selecting segments from the plurality of segments and generating a watermark. The watermark is generated by altering the number of geometric structures of the circuit design layout in the selected segments.

According to another embodiment, a method for watermarking a circuit design layout includes dividing a circuit design layout into a plurality of segments, selecting segments from the plurality of segments and generating a watermark by modifying routing of the original circuit design layout. The watermark is generated by altering the number of vias in the circuit design layout in the selected segments and is based exclusively on the change of the number of vias in the selected segments.

According to a further alternative embodiment, a method of watermarking a circuit design layout includes dividing a circuit design layout into a plurality of segments, selecting segments from the plurality of segments and generating a watermark by modifying routing of the original circuit design layout to alter the number of jogs in the circuit design layout in the selected segments. The watermark is based exclusively on the change of the number of jogs in the selected segments.

In certain embodiments, the number of vias is altered. In other embodiments, the number of vias is alternated. The number of vias and the number of jogs can also be altered to generate a watermark. In yet other embodiments, the number of other geometric structures besides vias and jogs can be altered. For example, the gap between line ends in selected segments of the design can be altered.

According to one embodiment, the number of geometric structures in selected segments can be altered by about 1-10% compared to the number of geometric structures in unselected segments. The alteration can reduce or increase the number of geometric structures relative to unselected segments. The watermark can be implemented by using a router to modify routing of the circuit design layout in the selected segment to alter the number of geometric structures in each selected segment.

The circuit design layout can be divided into segments that are the same shape, e.g., squares, rectangles, triangles or a combination of two or more thereof. The segments that are selected can be randomly selected or based on other criteria. The selected segments can be grouped together or separated from each other or both depending on the selection criteria.

Embodiments can be used to generate a watermark that encodes one or more bits of data. For example, a first bit can be encoded by a first set of selected segments, and a second bit is encoded by a second set of selected segments, and so on. The segments that form multiple bits can be non-overlapping or each segment is used for only one bit. According to one embodiment, the first and second sets of selected segments are interlaced with each other.

In various embodiments, the resulting watermark can be a two-dimensional watermark or a three-dimensional watermark with a depth component. For example, the number of geometric structures is changed can be based on a layer of the circuit design. With vias, for example, the number of vias can be changed in selected layers of selected segments. Thus, the change in a selected segment can impact all of the layers (as in a two-dimensional watermark), or only some of the layers (to form a three-dimensional watermark).

Other objects and features of embodiments will become apparent from consideration of the following description taken in conjunction with the accompanying drawings.

DETAILED DESCRIPTION OF ILLUSTRATED EMBODIMENTS

Embodiments of the invention provide a method for watermarking a circuit design layout based on the number or frequency of geometric structures of the design, rather than relying on netlists or topological routers that use atomic blocks and bubbles to convert canonical forms into topological signatures. Embodiments generate watermarks by altering the number of geometric structures in selected segments or portions of a design layout using a router. The changes made to these particular segments represent a secret "key." Alterations to the numbers of geometric structures in the "key" segments are sufficiently small so that they are not detectable and appear as white noise when randomly selected segments of the circuit layout design are analyzed.

Thus, the resulting watermark is difficult to detect without knowing which segments were selected and form the key or watermark. Inspecting the selected segments, however, clearly indicates a difference between the numbers of geometric structures in the selected segments compared to the number of geometric structures in a random sampling of segments. The resulting watermark is also resistant to tampering and modification since effective tampering can only be accomplished by large scale modifications to the circuit design, which are not desirable since significant portions of the design would be destroyed. Thus, embodiments eliminate reliance on netlists, and instead, generate watermarks that are based exclusively on the number of geometric structures in selected segments.

A watermark can be formed by randomly distributed selected segments. Using random distribution provides a number of advantages. For example, the watermark is more difficult to detect since the probability of selecting the exact sequence of selected segments is low. Further, the mark is more robust. For example, randomly distributed segments can encode multiple bits of data. Segments that are selected are likely to belong to different groups or bits of data. Consequently, it is difficult to attack individual bits. Random distribution also makes the mark easier to apply to a circuit design since it is not necessary to conform to circuit design and positioning constraints. Further aspects of embodiments are described with reference to FIGS. 1-19.

Referring to FIG. 1, one method 100 of generating a watermark for a circuit design layout involves dividing the circuit design layout into a plurality of segments, or tiling the layout, in step 105. This step is performed before routing. In step 110, certain segments of the plurality of segments are selected. The selected segments can be grouped together. According to one embodiment, the segments are separated, e.g., randomly distributed, so that they are more difficult to detect and the probability of selecting the exact sequence is relatively low. In step 115, the number of geometric structures in the selected segments is altered using a router. The number of geometric structures in segments that are not selected can remain unchanged. The segments having the altered number of geometric structures form a watermark of the circuit design layout. Embodiments can be used to generate watermark for identification purposes and, in addition, a watermark that encodes one or more bits of data.

Figure 2:
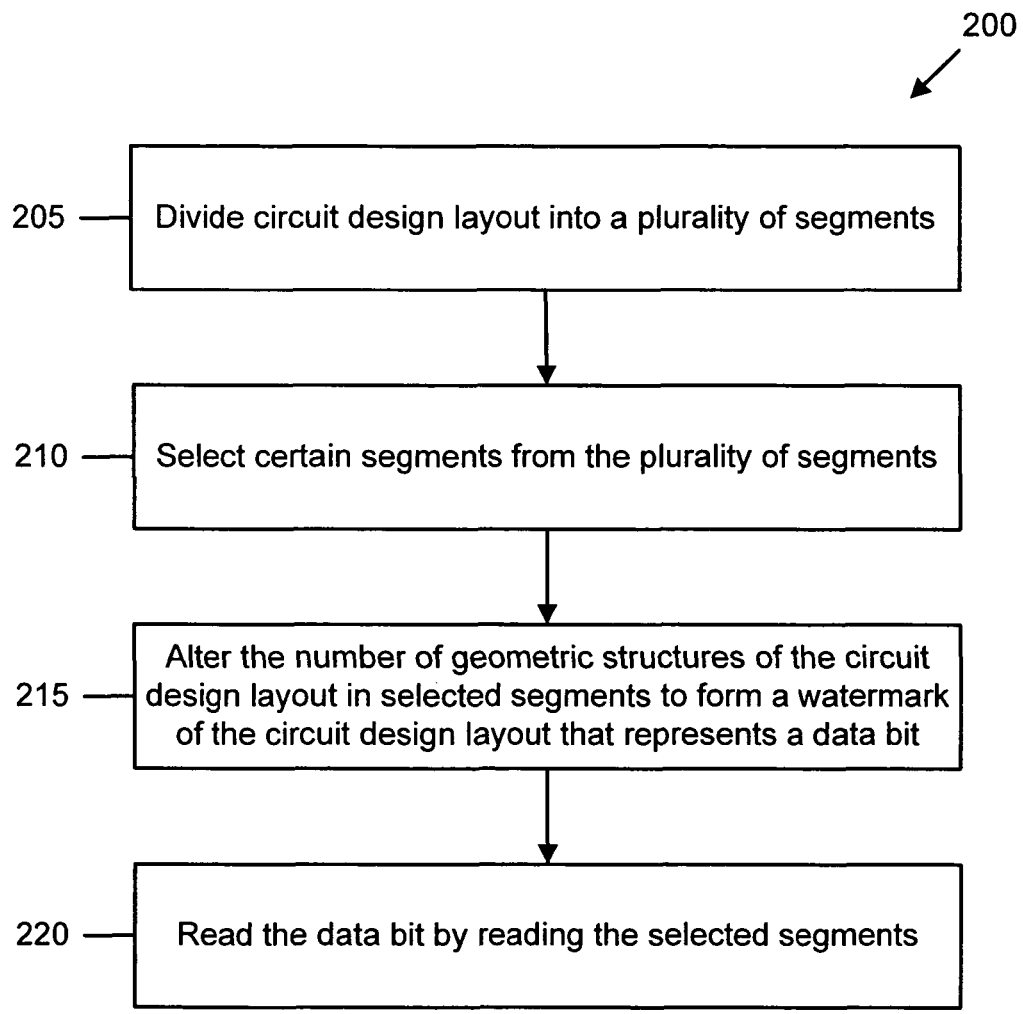
FIG. 2 is a flow chart illustrating a method of watermarking a circuit design layout and encoding a bit of data according to another embodiment.

For example, referring to FIG. 2, one embodiment of a method 200 includes dividing a circuit design layout into segments or tiles in step 205, and certain segments are selected in step 210. In step 215, the number of geometric structures in the selected segments is altered to generate a watermark. In one embodiment, the watermark represents a bit of data (e.g., a "0" or a "1"). This bit of data can be decoded in step 220 by reading the selected segments.

Figure 3:
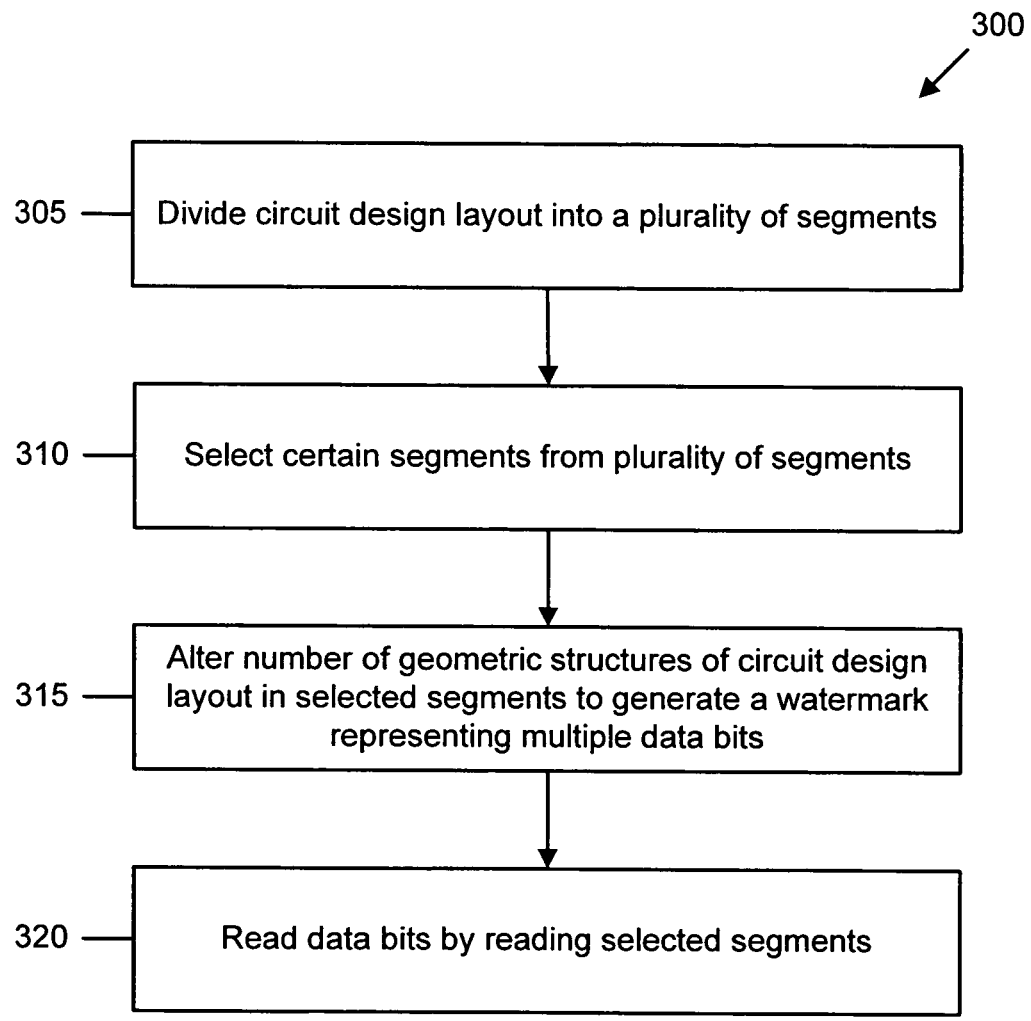
FIG. 3 is a flow chart illustrating a method of watermarking a circuit design layout and encoding multiple bits data according to another embodiment.

Referring to FIG. 3, a method 300 according to an alternative embodiment includes steps 305 and 310, which are similar to steps 205 and 210 described above. In step 315, the number of geometric structures of the circuit design layout in the selected segments is altered. These alterations generate a watermark that represents multiple bits of data, which can be decoded in step 320 by reading the selected segments.

Figure 4:
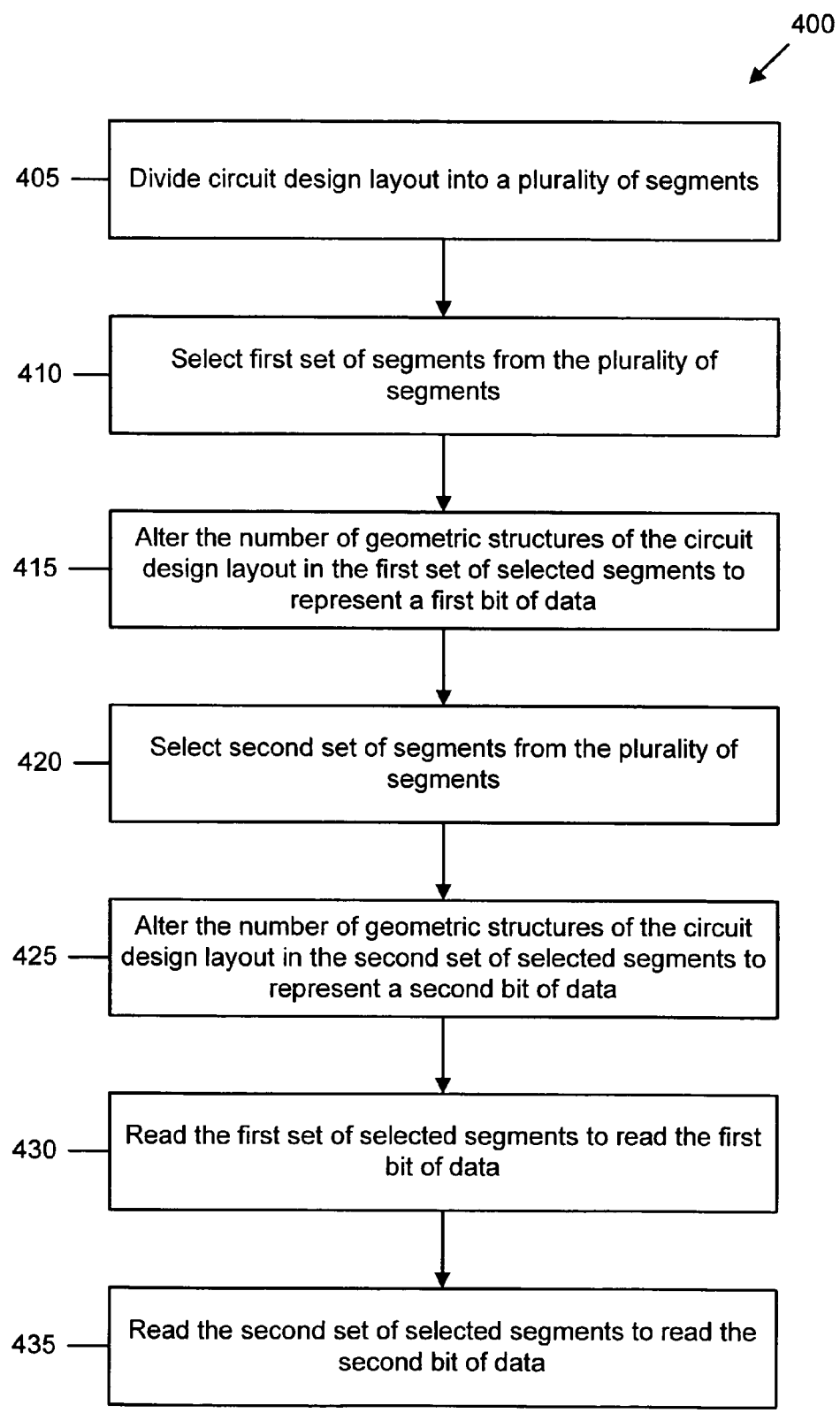
FIG. 4 is a flow chart further illustrating a method of watermarking and encoding a circuit design layout with multiple bits data.

For example, referring to FIG. 4, in one embodiment, a method 400 includes step 405 of dividing a circuit design layout into segments or tiles. In step 410, a first set of segments are selected from the plurality of segments. The first set of segments (and other sets) can be a group of segments or segments that are separated from each other. For example, the selected segments can be randomly distributed and have statistical properties of a random sequence. In step 415, the number of geometric structures in the first set of selected segments is altered and represents a first bit of data. In step 420, a second set of segments is selected from the plurality of segments. In step 425, the number of geometric structures in the second set is altered and represents a second bit of data. Additional sets of data can be used to encode additional bits of data. In steps 430 and 435, the first and second bits (and any other bits) of data can be decoded by reading respective first and second selected segments. FIGS. 5-19 illustrate various embodiments and how they can be implemented.

Figure 5:
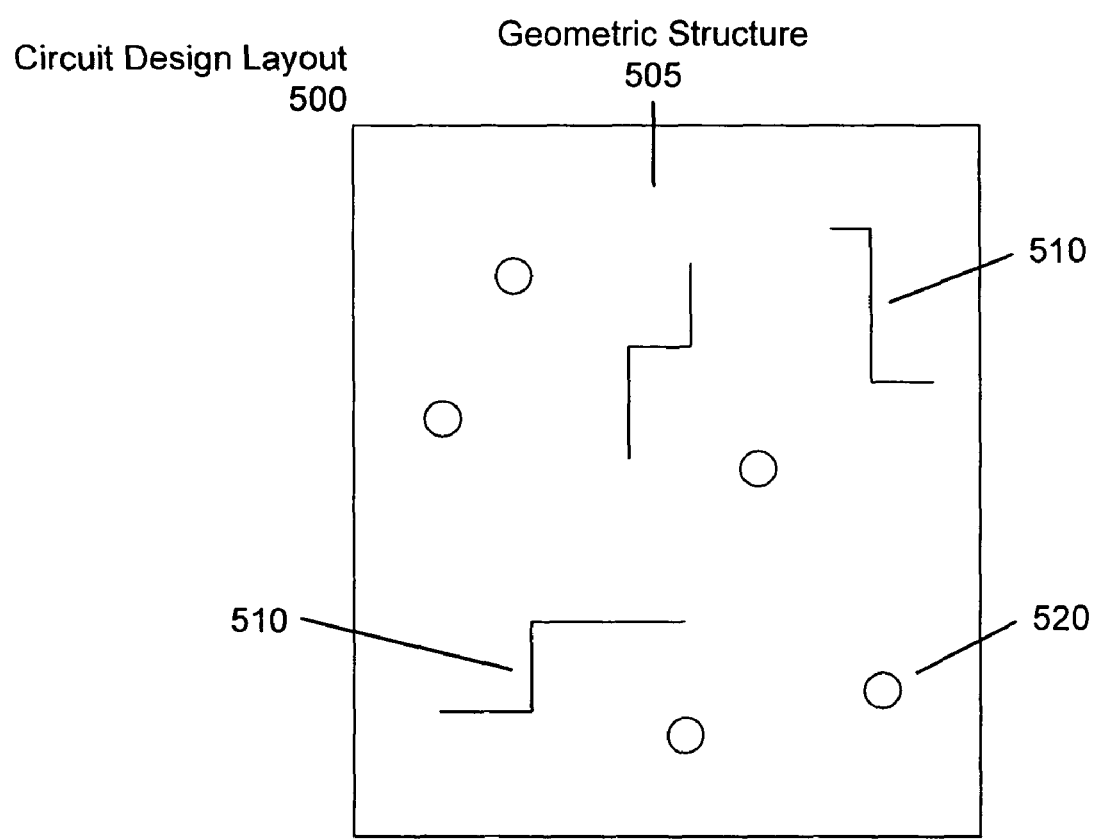
FIG. 5 illustrates a generic circuit design layout and geometric structures thereof.

FIG. 5 generally illustrates a circuit design layout 500 having geometric structures 505. As known in the art, a typical circuit design layout 500 can include multiple layers or planes (generally layers), connections through multiple layers, transistors, capacitors and other electrical devices and various geometric structures 505, such as jogs 510 and vias 520 (as shown in FIG. 5). A jog 510 is a jump from one track to another and is shown generally as a lid. A via 520 provides a connection point between different layers and is shown generally as a circle.

Embodiments can also be applied to other geometric structures such as adjacent line ends with varying distance to each other, and other patterns made of multiple metal shapes. Line ends are two wires that belong to the same or different nets may be located within a small gap. A watermark can be generated by manipulating the distances or gaps between line ends of selected segments of the circuit. Persons skilled in the art will appreciate that embodiments can be applied to various design layouts and various geometric structures. Accordingly, specific design layouts are not illustrated, and this specification refers to varying the frequency or number of jogs 510 and/or vias 520 for purposes of explanation and illustration, not limitation.

Referring to FIG. 6, a tiling or segmentation structure 600 is imposed or overlaid on the circuit design layout 500. In the illustrated embodiment, the layout 500 is divided into tiles or segments 610 shaped as squares. According to one embodiment, each segment or tile 610 is the same size. According to another embodiment, the dimension or length of a side of a segment 610 can be determined based on the number of routing tracks passing through a segment 610 being less than or equal to a pre-determined value. The pre-determined value can be determined based on a particular application and by testing with a given routing software.

Alternatively, some or all of the segments or tiles 610 can be different sizes. For example, edges of a segmentation structure may have smaller sized segments—an edge can be a rectangle, whereas other segments are squares. Further, the layout 500 can be divided into segments 610 of different shapes, such as rectangles, triangles, and other shapes, which can be the same or different sizes. The tiling structure 600 can also be offset relative to a design layout so that tile borders align with regular chip geometries such as power rails. For purposes of illustration and explanation, not limitation, this specification refers to a square tiling structure 600 over the circuit design layout 500 without offsets. However, persons skilled in the art will appreciate that offsets can be used as necessary.

Figure 7:
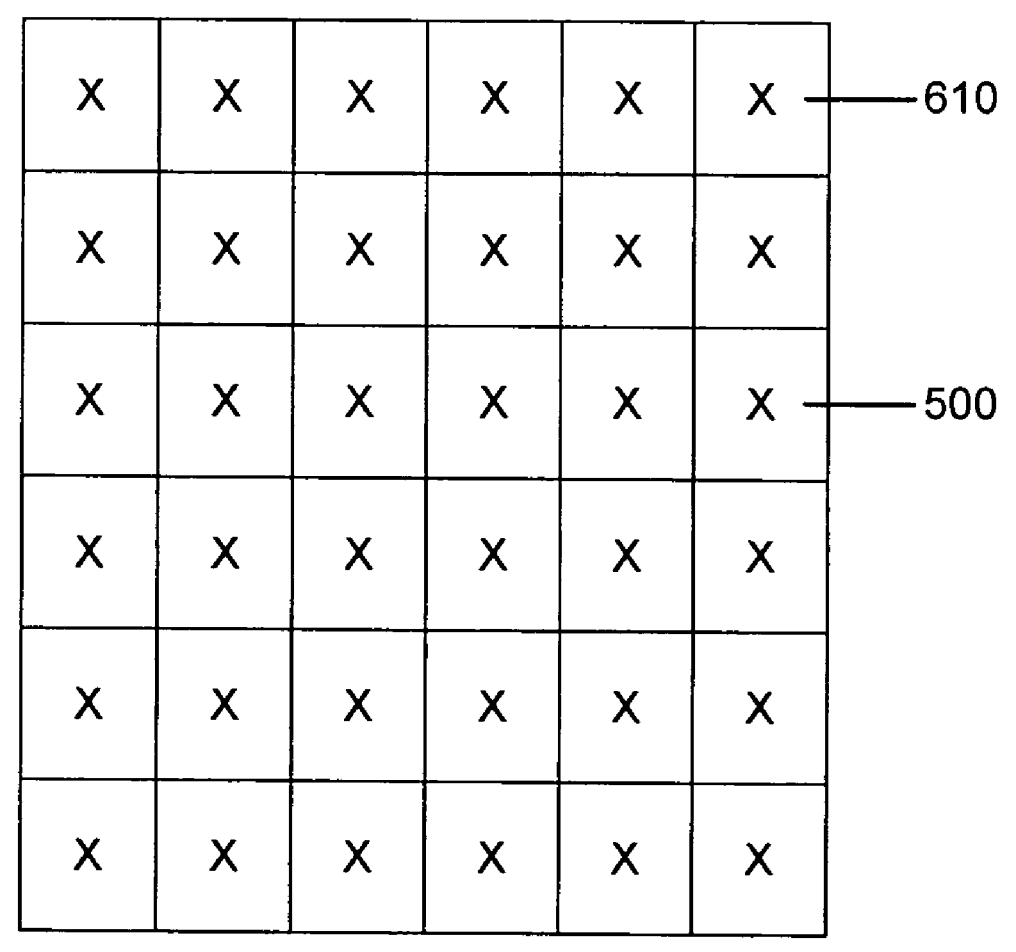

FIG. 6 illustrates each segment or tile 610 having various numbers of geometric structures. In particular, certain segments 620 have "X" number of geometric structures, other segments 630 have "Y" number geometric structures, and other segments 640 having "Z" number of geometric structures. Alternatively, the circuit layout 500 can be designed so that each segment 610 has the same number of geometric structures (as shown in FIG. 7). The following description is made with reference to FIG. 6.

There can be an equal number of segments with X, Y and Z numbers of geometric structures 505 or there may be a different number of segments 610 with different numbers of geometric structures 505. In use, there may be a large number of segments 610, each of which has a different number of geometric structures 505. Accordingly, FIG. 6, which illustrates segments 610 being divided so that each segment 610 has one of three different numbers (X, Y, Z) of structures 505, is provided for purposes of illustration and explanation, not limitation, since there may be many more segments 610 with different numbers of geometric structures 505 in practice.

Figure 8:
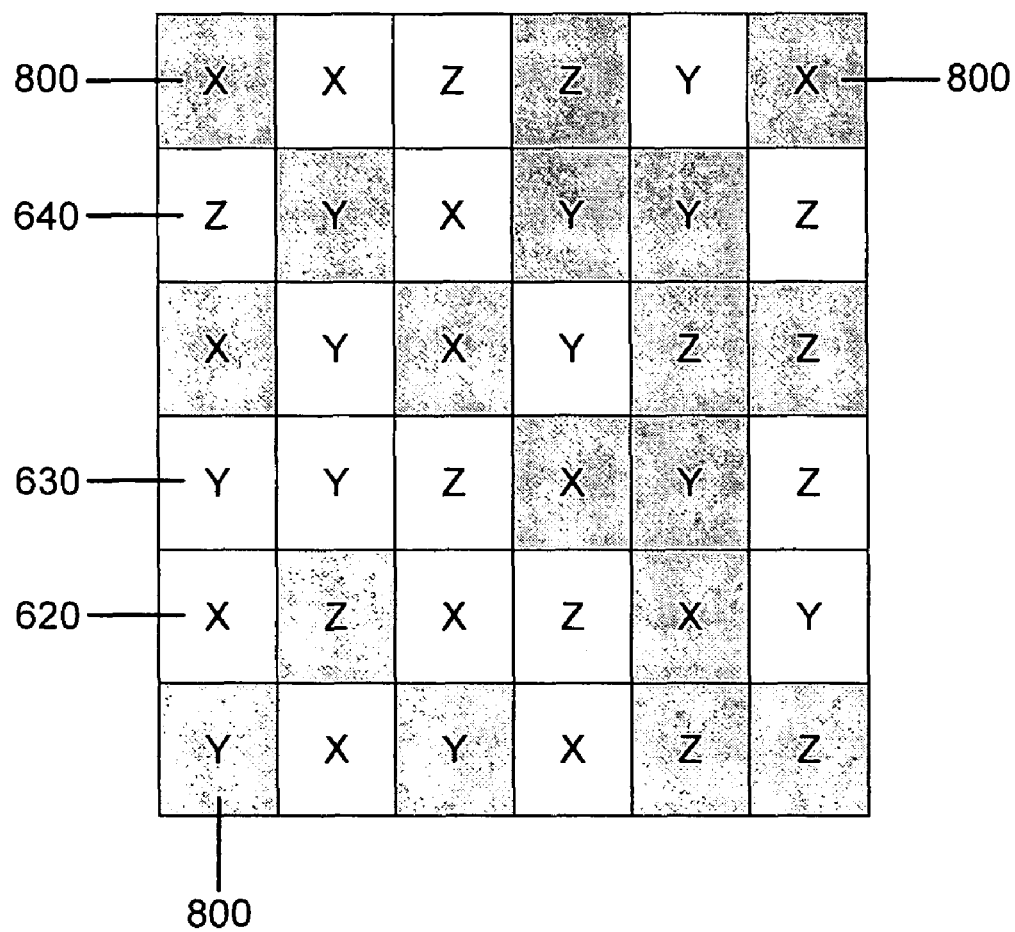
FIG. 8 illustrates selected segments of the segmented circuit layout design shown in FIG. 6.

Referring to FIG. 8, certain segments 800 of the tiled layout shown in FIG. 6 are selected from the plurality of segments 610. The selected segments 800 are shown as shaded segments in FIG. 8 and in other Figures. In the illustrated embodiment, 50% of the plurality of segments 610 are selected segments 800 and form the "secret key" or watermark. Indeed, other numbers of segments 800 can be selected, and 50% is provided as an illustrative example.

Figure 9:
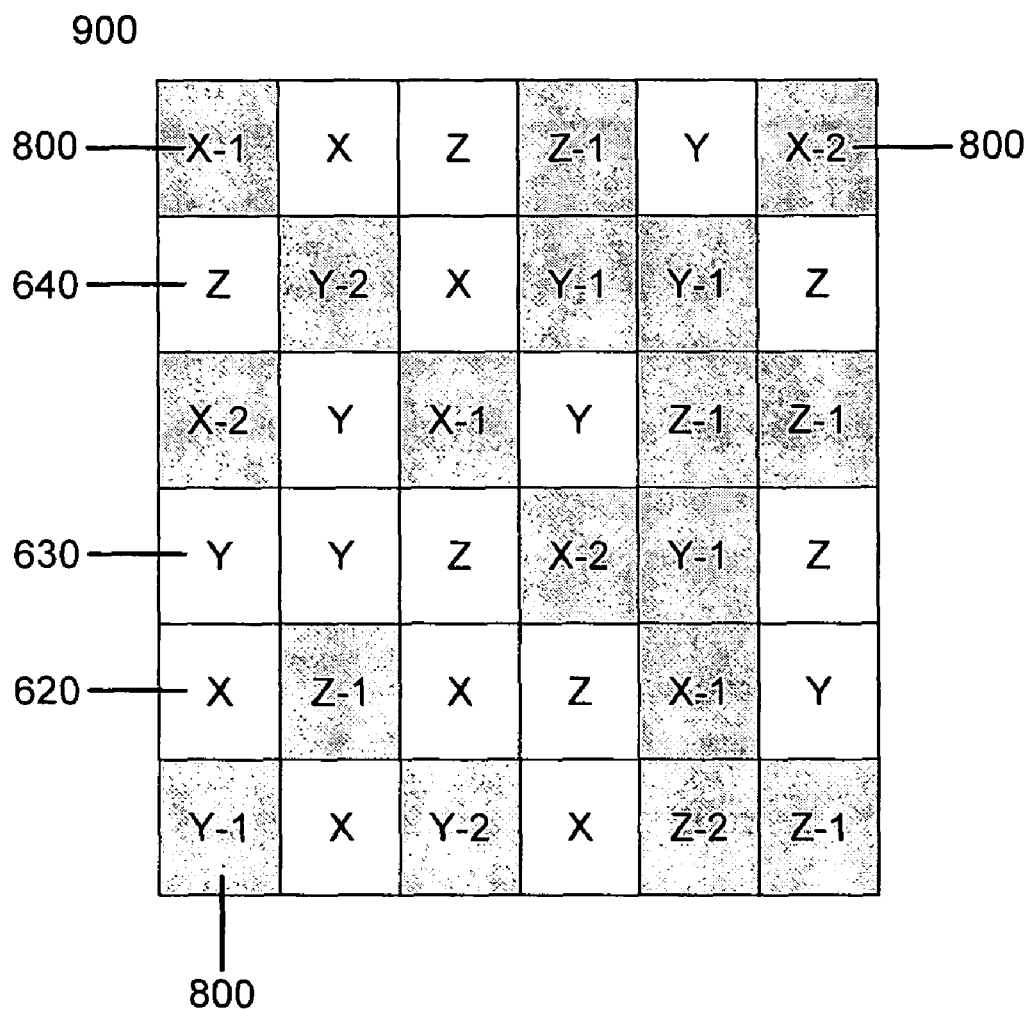
FIG. 9 illustrates altering the number of geometric structures in selected segments to generate a watermark according to one embodiment.

Referring to FIG. 9, the number of geometric structures 505 in each selected segment 800 is altered in order to generate a watermark 900. The number of structures 505 can be changed by a relatively small amount, e.g., by 1-10%, to form a watermark that is difficult to detect. In the illustrated embodiment, the number of geometric structures 505 is decreased in each selected segment 800, as shown by X−1, X−2, Y−1, Y−2, Z−1 and Z−2. In practice, the reduction can be substantially larger since there can be a larger number of geometric structures 505 in a segment 610. Further, the number of geometric structures 505 can be reduced by different amounts (as shown in FIG. 9) or by the same amounts in each selected segment 800. Thus, the reduction of the number of geometric structures 505 can result in selected segments 800 having the same or different number of geometric structures 505, but the variation in the selected segments 800 generates the watermark 900.

Figure 10:
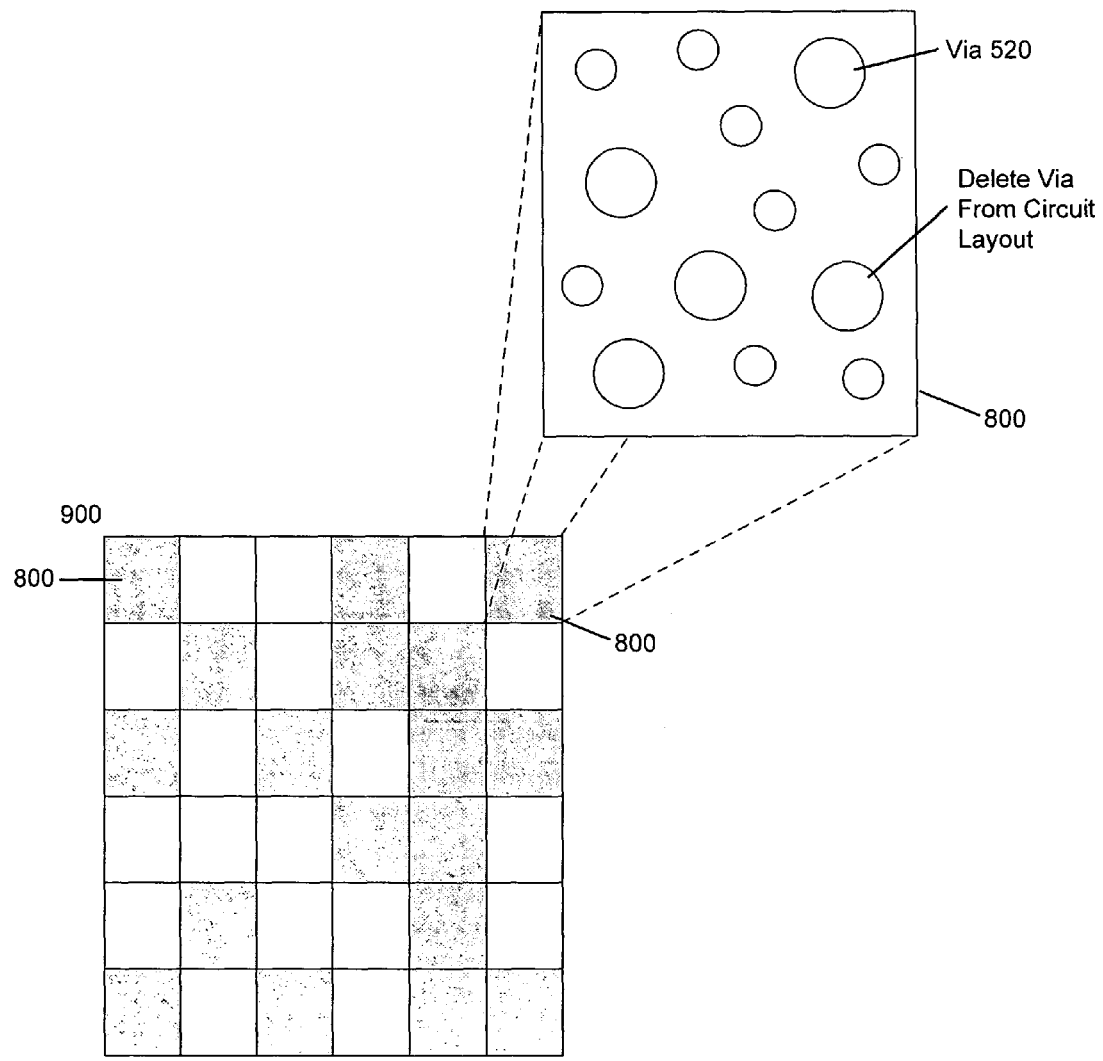
FIG. 10 illustrates a circuit design layout having vias and altering the number of vias in a selected segment according to one embodiment.
Figure 11:
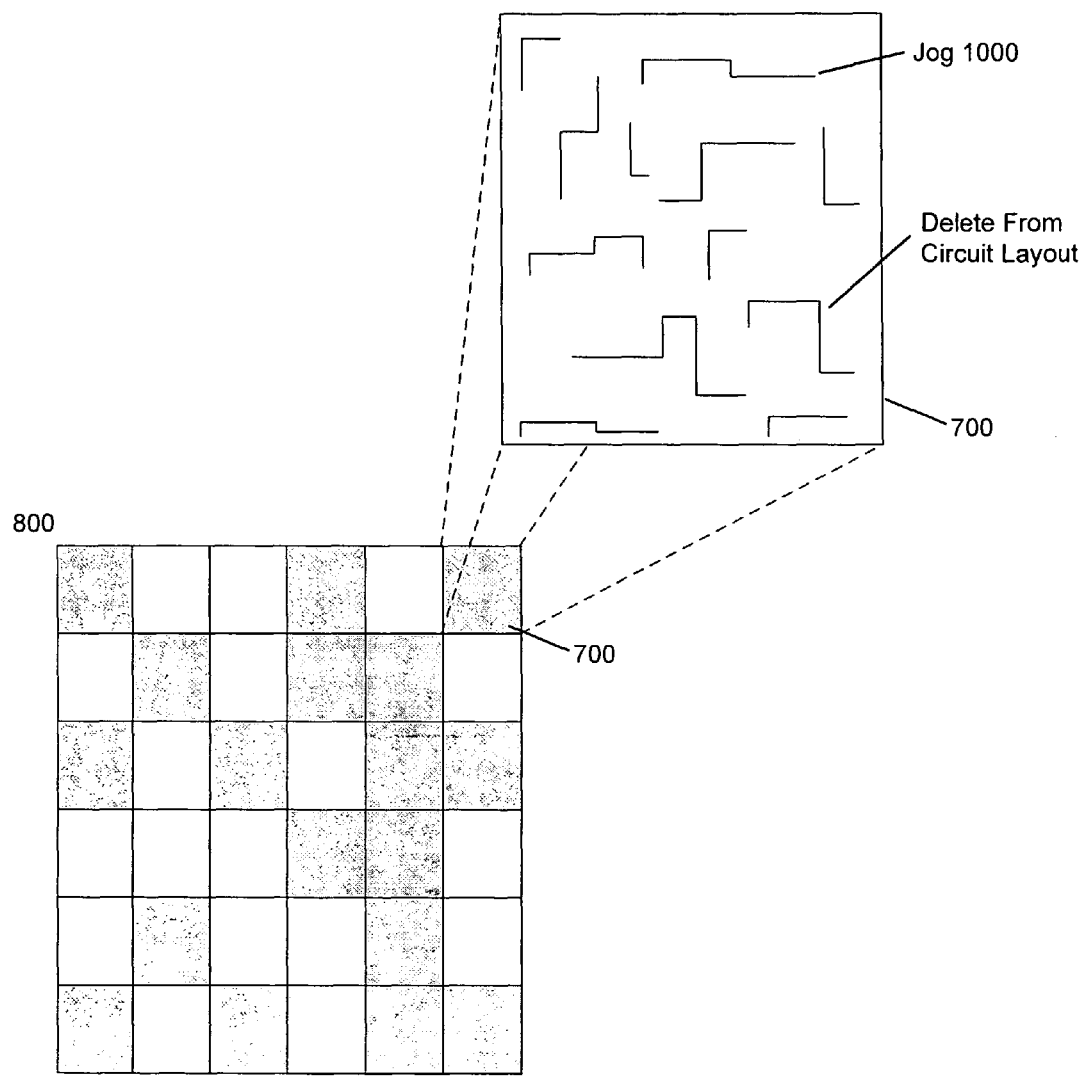
FIG. 11 illustrates a circuit design layout having jogs and altering the number of jogs in a selected segment according to one embodiment.

Referring to FIG. 10, according to one embodiment, the number of vias 520 (generally illustrated as a circle) is reduced in each selected segment 800 to generate a watermark 900. Changing the number of vias 520 is advantageous since circuit modifications are made more difficult due to vias extending through multiple layers of the circuit. Referring to FIG. 11, according to another embodiment, the number of jogs 510 (generally illustrated as a line showing a jump from one track to another) is reduced in the selected segments 800. Alternative embodiments can be applied to both vias 520 and jogs 510, and other geometric structures, such as adjacent line ends separated by a certain distance.

For example, according to another embodiment, a watermark can be generated by altering adjacent line ends or two wires that belong to the same or different nets may be located within a small gap. In this embodiment, the distance between the geometries (or whether the distance is in a specific range/multiple) can be altered. Typically, layout rules require a certain minimum distance between line ends or wires. There is often a given minimum step size in which this distance can vary (Y). Embodiments can alter the frequency or number of occurrences by altering the gap according to "a+n*Y" where "Y" is a minimum step size in which a gap distance can vary, "a" is a constant that depends on minimum distance values according to process rules and the size of certain elementary structures, such as a via, and "n" is an even number. These numbers can be compared to the frequency or number of occurrences with an odd number n. Indeed, other criteria can be utilized as necessary. Reference is made to altering the number of jogs and vias for purposes of explanation, not limitation. Thus, FIGS. 10 and 11 are provided for purposes of explanation, not limitation.

FIGS. 9-11 illustrate reducing the number of geometric structures 505 in the selected segments 800 to generate a watermark 900. According to another embodiment, the number of geometric structures 505 can be increased. Whether to reduce or increase the number of geometric structures 505 can depend on, for example, design, routing and/or cost considerations.

Changes in the number of geometric structures 505, e.g., whether reducing or increasing the number of structures, are implemented by a router. The routing changes are not so substantial that they are readily detectable based on a random sampling of segments 610, but the watermark 900 is easily identified when the selected segments 800 are inspected. Thus, the resulting watermark 900 that is generated by altering the structure 505 count in selected segments 800 is similar to white noise if segments are analyzed without knowing the secret key, and tampering with the watermark can only be achieved with substantial modifications, which are not desirable. Preferably, changes in the structure count of the selected segments 800 are sufficiently minor so that routing costs are controlled and quality of routing is maintained. A wider range of acceptable changes in the structure count can be used if individual segments have greater numbers of structures.

Figure 12:
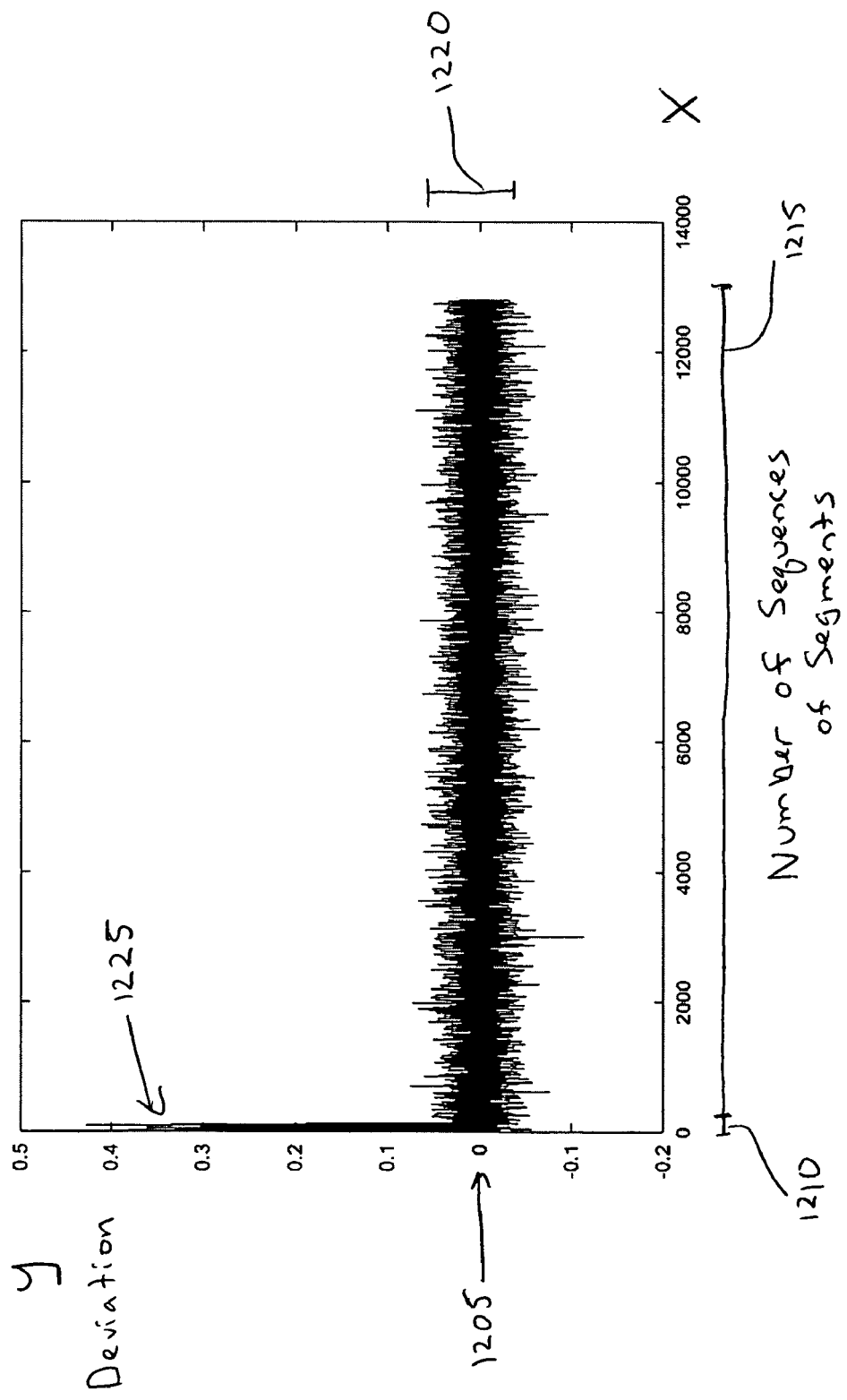
FIG. 12 is a chart illustrating how slight variations in the number of geometric structures in selected segments can identify a watermark relative to variations in randomly selected segments.

FIG. 12 is a graph generally illustrating how embodiments effectively mask a watermark 900 formed by selected segments 800 compared to a random sampling of segments that may or may not include selected segments 800. FIG. 12 illustrates an example involving changing the number of vias 520. A determination of the mean number of vias 520 in each segment 610 is determined and identified as "0" on the y axis at point 1205. The x axis of FIG. 12 represents a number of sequences of segments. Section 1210 of the left end of the x axis represents a sequence of selected segments 800 that form the watermark 900, and section 1215, or the remainder of the x axis, represents random sequences of segments, which may or may not include selected segments. The y axis represents the deviation of the number of vias of the inspected segments relative to the mean number 1205 of vias.

As shown in FIG. 12, when random sequences of tiles are inspected, there is very little variation 1220 in the number of vias relative to the mean 1205 since the variation is relatively constant over the x axis section 1215. However, inspecting segments having the altered number of geometric structures to form a watermark 900 (section 1210) indicates a variation, e.g., a spike 1225, which shows that the variation of the number of geometric structures in the selected segments is readily identifiable relative to the mean 1205. This result is obtained since the number of geometric structures in each selected segment is changed (rather than only a few segments in a random sampling), and such an identifiable distribution is achieved even though the change in the number of geometric structures 505 is relatively small. In other words, selected segments 800 that are randomly interspersed with other non-selected segments 610 result in small variations or white noise, but inspecting selected segments 800 generates a result that is distinguishable from the white noise.

Figure 13:
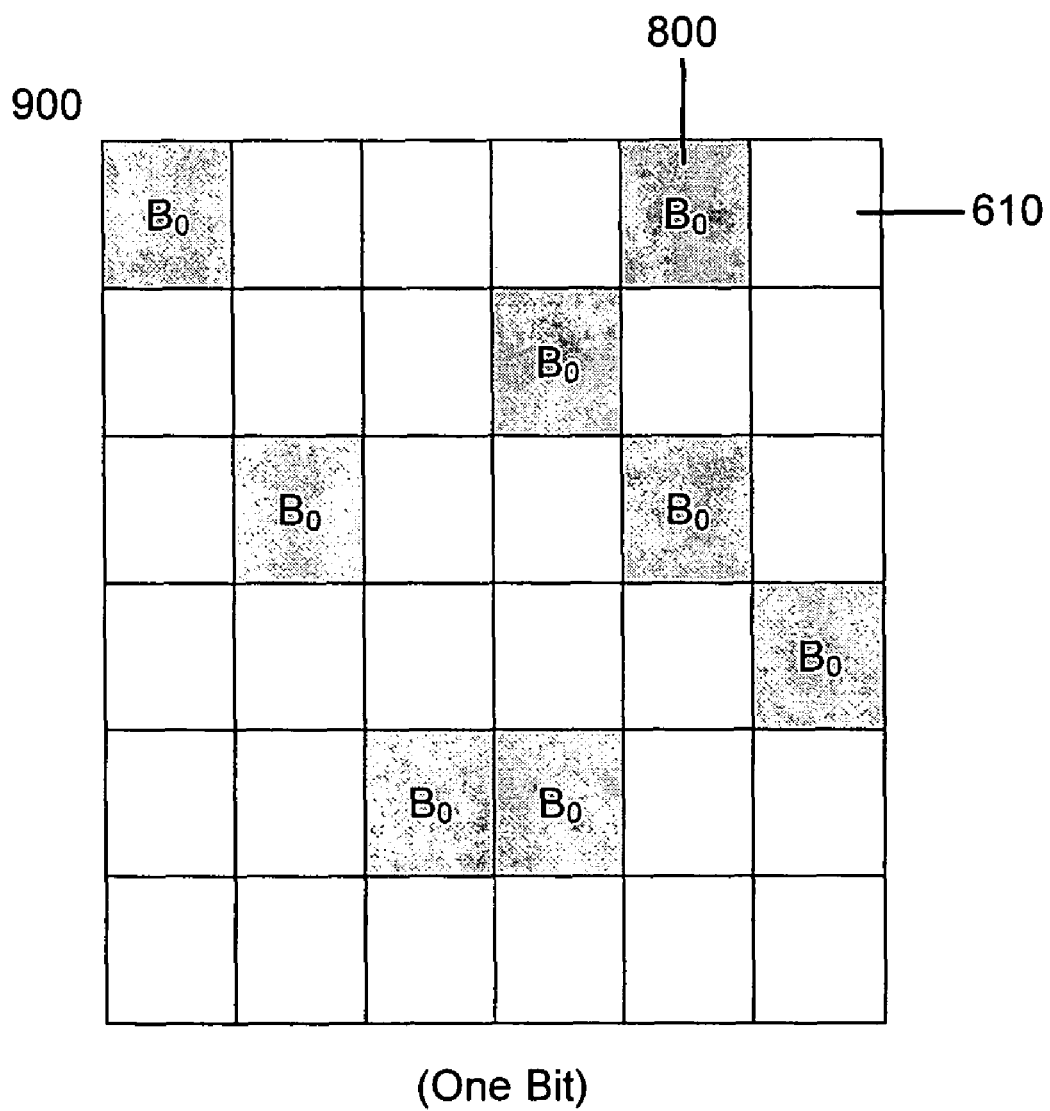
FIG. 13 illustrates a watermark having first set of selected segments that encodes a first bit of data.
Figure 14:
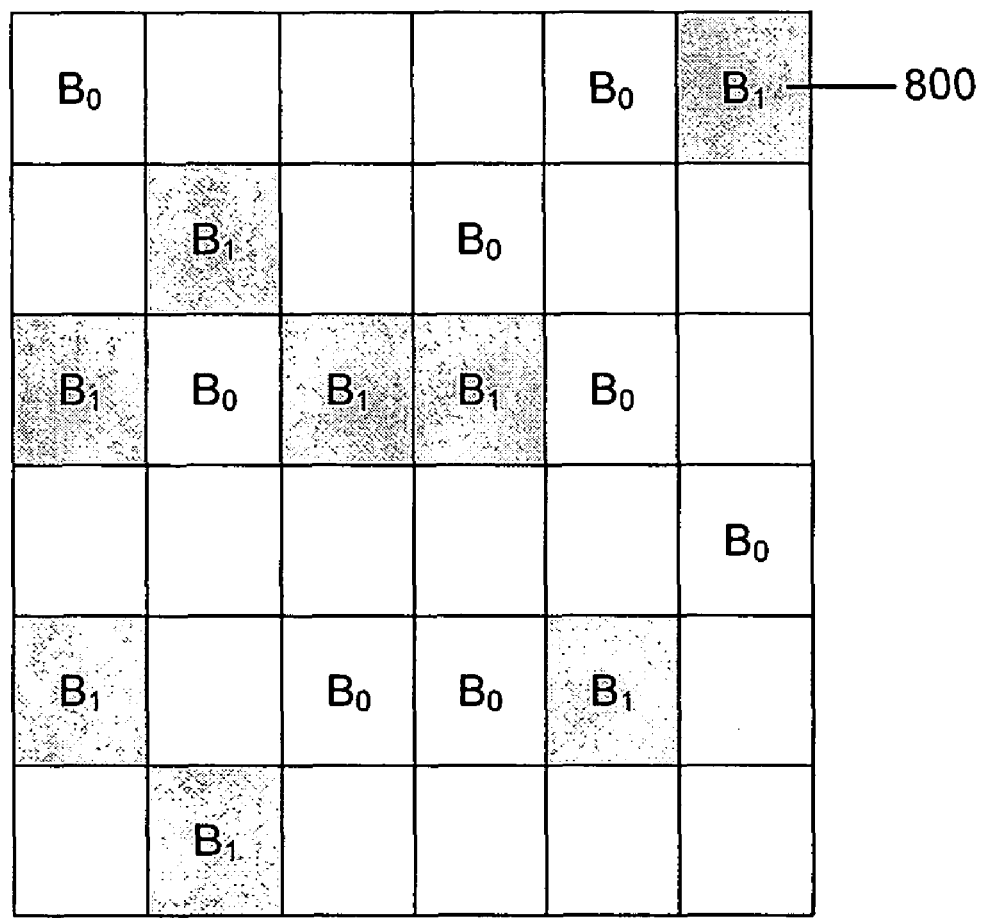
FIG. 14 illustrates a watermark having a second set of selected segments that encodes a second bit of data.
Figure 15:
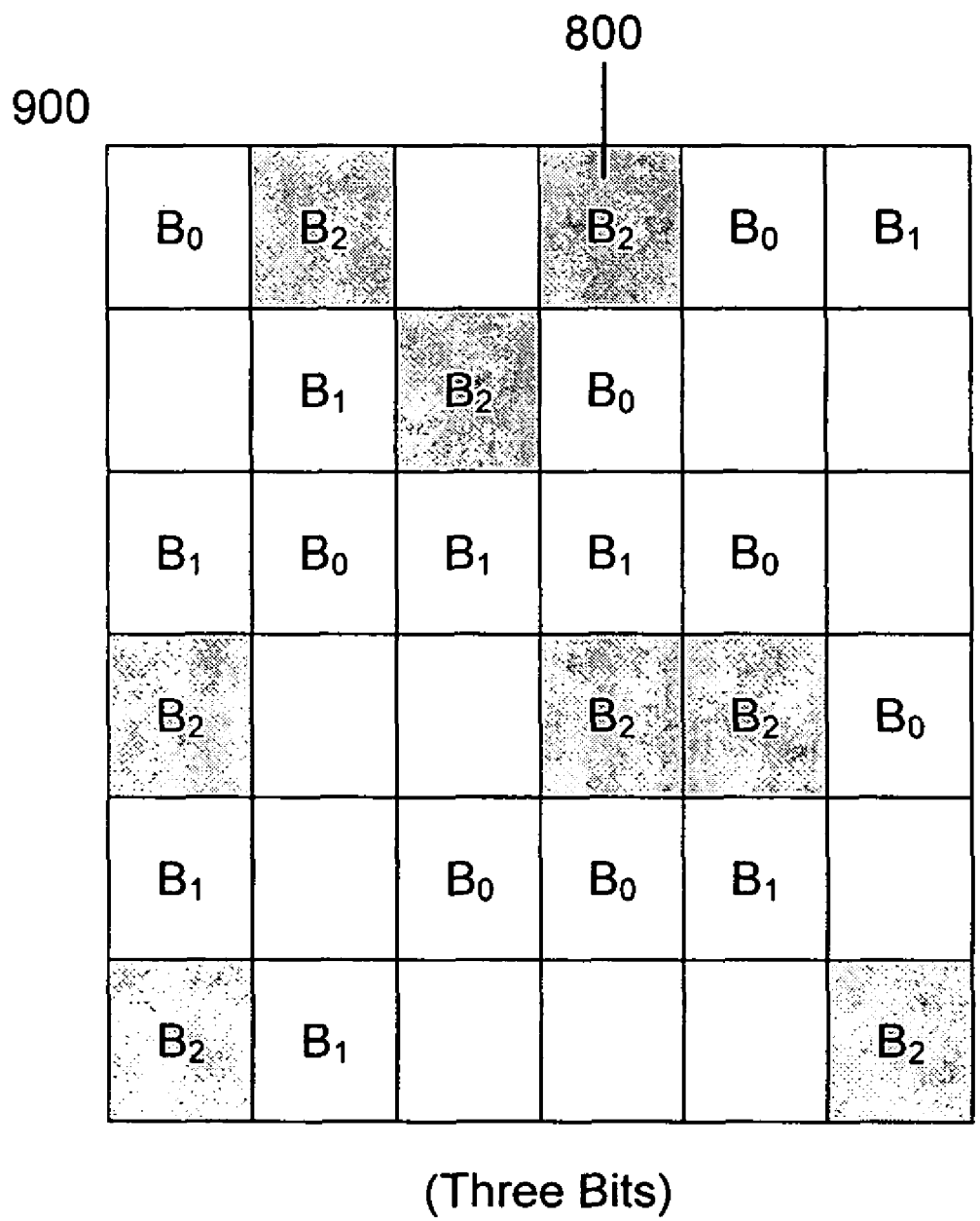
FIG. 15 illustrates a watermark having a third set of selected segments that encodes a third bit of data.
Figure 16:
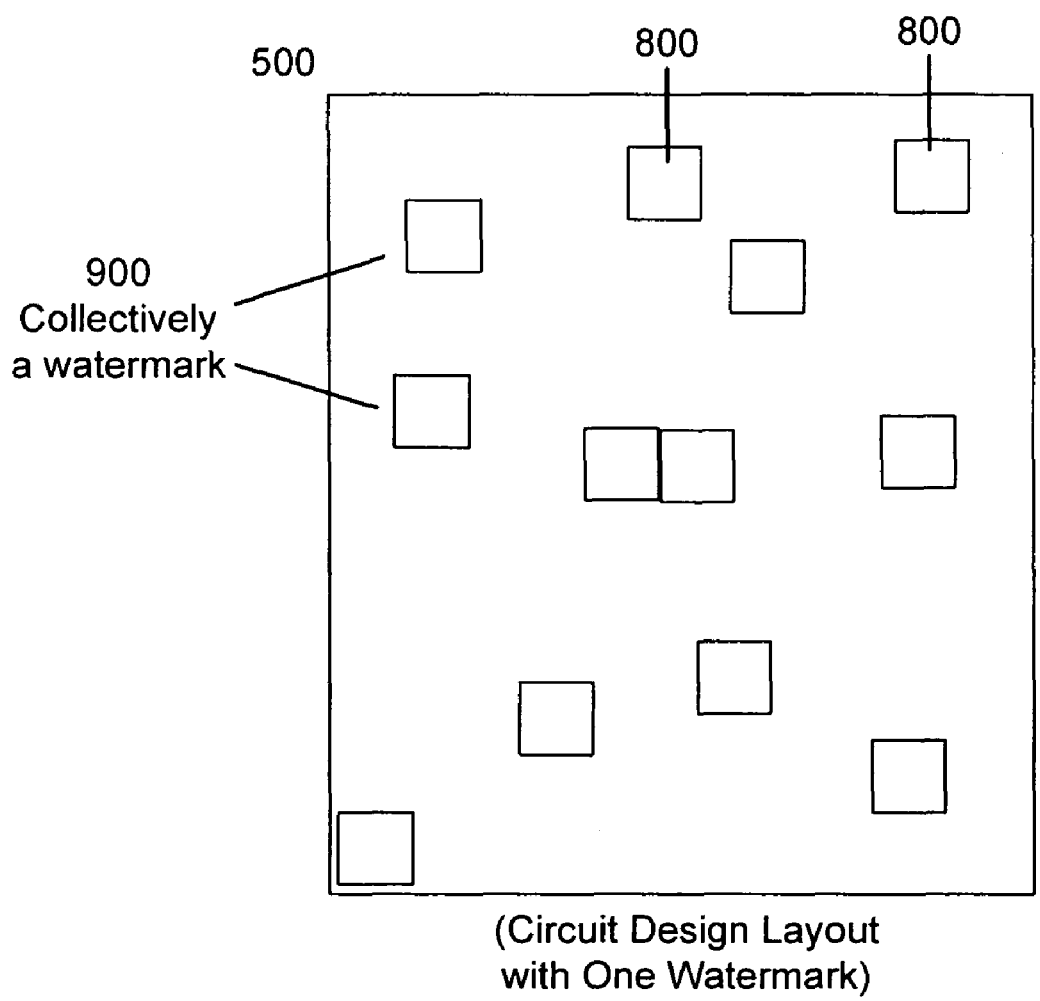
FIG. 16 illustrates selected segments collectively forming a single watermark.
Figure 17:
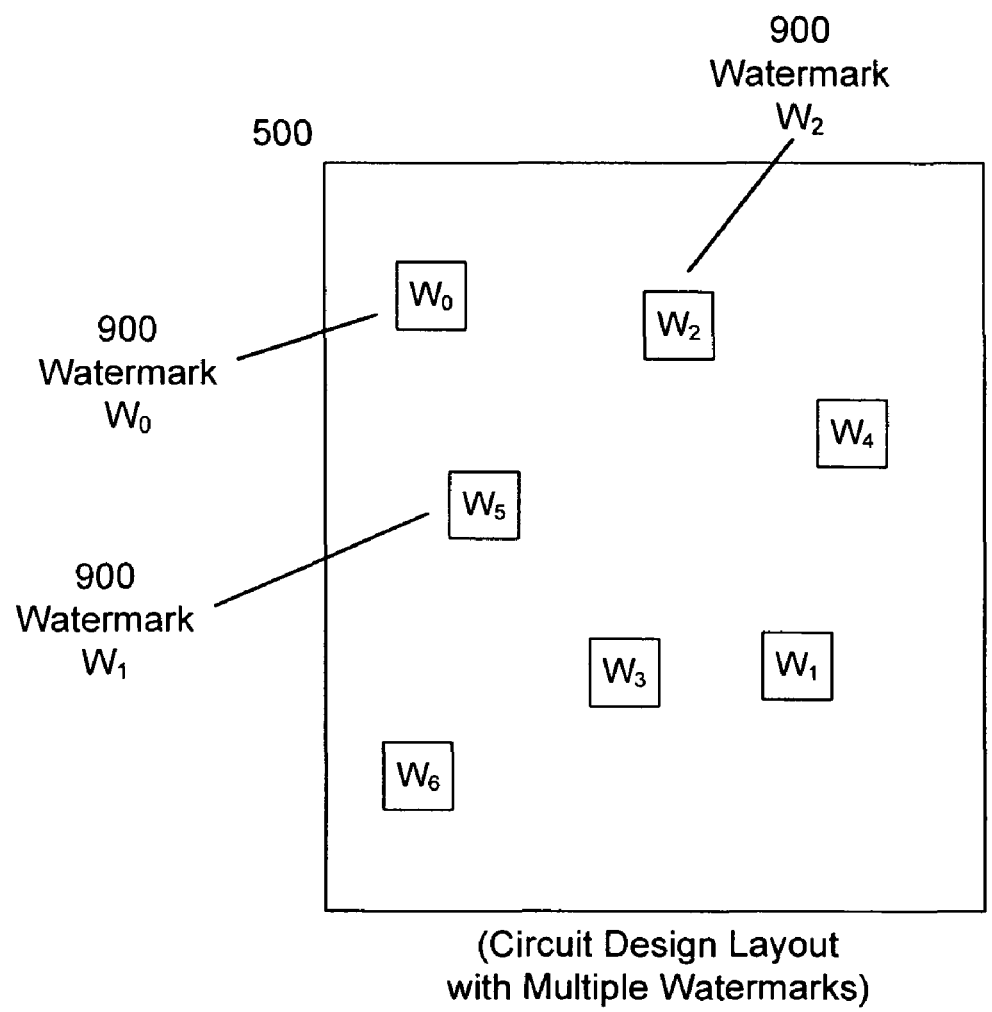
FIG. 17 illustrates a circuit design layout having multiple watermarks.

According to another embodiment, the selected segments in which the number of geometric structures is changed can be based on three-dimensional criteria, e.g., on a layer of the circuit design. For example, with vias, the frequency or number of vias can be changed in selected segments, but only in certain layers of the circuit design. Thus, the change in a selected segment can impact all of the layers, or only some of the layers, and embodiments can be used to apply "two-dimensional" and "three-dimensional" watermarks. Whether to implement 2-D or 3-D watermarks can depend on, for example, routing considerations within the selected segment regions. Referring to FIGS. 13-19, embodiments can be applied so that the watermark 900 or portion thereof encode one or more bits of data. Referring to FIG. 13, the selected segments 800 that form a watermark 900 encode a bit B0 of data. Bit B0 is formed by eight selected segments 800. A bit of data can also be formed by other numbers of segments. Referring to FIG. 14, the watermark 900 includes a first set of selected segments 800 that forms a first bit B0 of data, and a second set of selected segments that forms a second bit B1 of data. A shown in FIG. 14, bits B0 and B1 are formed by the same number of segments and are non-overlapping. In other words, one selected segment 800 is not used to encode multiple bits. Further, the selected segments 800 are interlaced or interweaved with each other. Referring to FIG. 15, the watermark 900 includes a first set of selected segments 900 that forms a first bit B0 of data, a second set of selected segments 800 that forms a second bit B1 of data, and a third set of selected segments 800 that forms a third bit B2. In the illustrated embodiment, bits B0, B1 and B2 are formed by the same number of selected segments 800, are non-overlapping and are interlaced or interweaved with each other. The interlacing pattern can be pre-determined or randomly selected. A watermark 900 can encode other numbers of bits, and bits can be represented with other numbers of segments. According to another embodiment, alternative embodiments are directed selected segments being based on bits that were already read. For example, a key can define segments that are used to encode the first N-bits, and the first N-bits are used to generate a second key. The second key can be a design-dependent key that is used to select remaining segments. Such a system would present further difficulties to attackers. Additionally, a single circuit design layout 500 can be encoded with one or multiple watermarks. As shown in FIG. 16, a circuit design layout 500 is segmented so that the number of geometric structures 505 are altered in selected segments, which collectively define a single watermark 900. The watermark 900 can define one or more data bits as described above. Referring to FIG. 17, a circuit design layout can have multiple independent watermarks 900 ($W_0$-$W_6$), each of which can define one or more data bits as described above. This embodiment may be particularly useful when working with large circuit layouts 500. Thus, embodiments advantageously encode data using one or multiple watermarks as necessary, thereby making detection and modification of the watermark patterns by third parties even more difficult.

Figure 18:
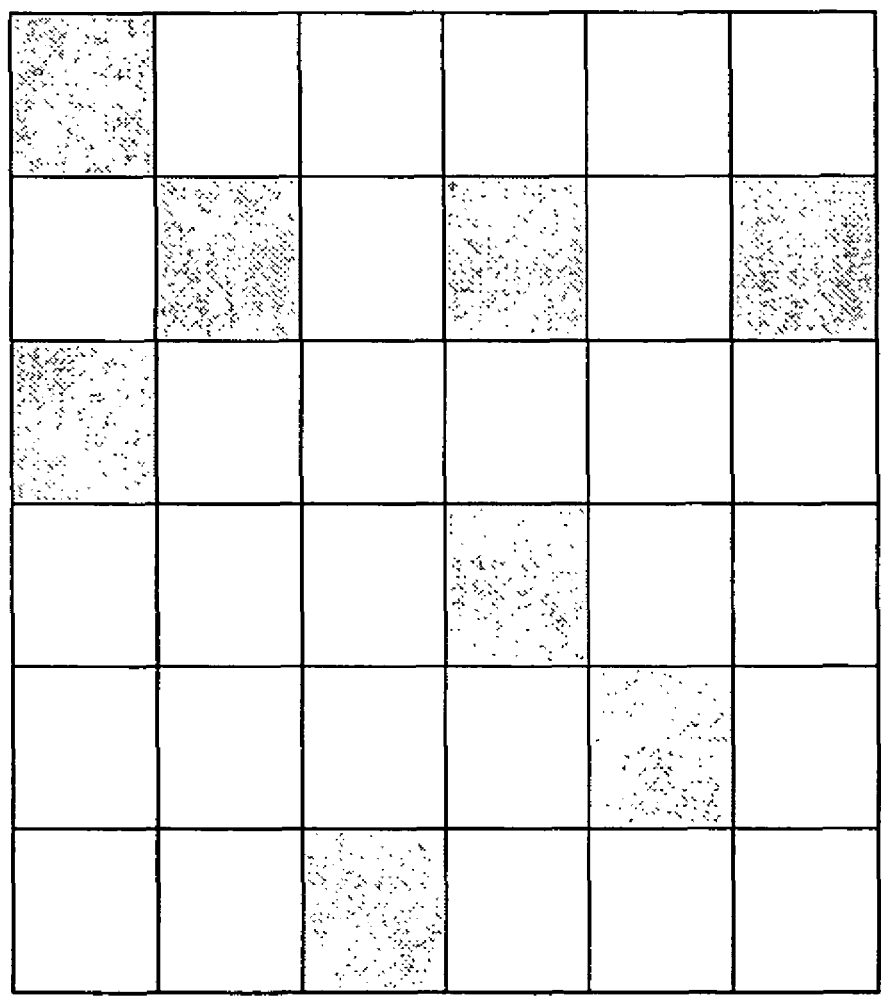
FIG. 18 illustrates selected segments B encoding a "0" bit of data.
Figure 19:
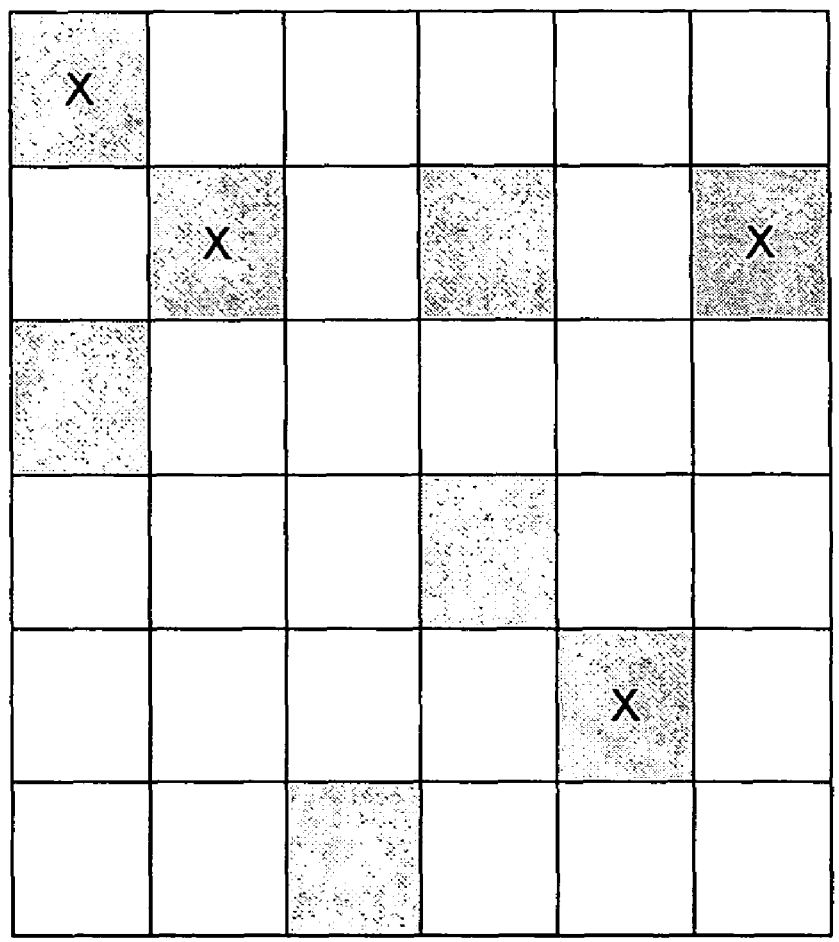
FIG. 19 illustrates selected segments encoding a "1" bit of data.

Referring to FIGS. 18 and 19, according to one embodiment, a "0" bit 1800 is encoded by unmarked selected segments, and a "1" bit 1900 is encoded by marking a certain number of selected segments. In the embodiment shown in FIG. 19, a "1" bit is encoded by marking 50% of the selected segments, as shown by certain selected segments being marked with "X" 1910. The "X" tiles are marked by, for example, changing the costs of implementing certain structures (the encoding geometries) during routing within that segment.

More particularly, according to one embodiment, tiles that will be used to encode a bit are selected. For example, if multiple bits are to be encoded, tiles that encode a first bit are selected, tiles that encode a second bit are selected, and so on, for each bit. The selection of bits can be based on, for example, by randomized interlacing. In the illustrated embodiment, half of the selected tiles (for each bit) are selected as tiles that can be marked. Alternative embodiments can utilize other numbers of tiles for marking, and selecting half of the tiles is provided for purposes of explanation, not limitation. Thus, half of the bits that are selected to encode the first bit are selected as being markable, half of the bits that are selected to encode the second bit are selected as being markable, and so on. The criteria for selecting which bits are markable can be, for example, randomly selected or based on other suitable criteria.

In the illustrated embodiment, if selected bits are to be encoded as a "0" then the markable bits are not changed and no modifications are made to the frequency count of geometric structures for a tile for that bit. However, if the selected bits are to be encoded as a "1", then in each of the markable bits, the frequency of geometric structures in these "marked" tiles is altered, thus marking these tiles.

When a bit is to be read to determine whether the bit is a "0" or "1", the median frequency or count of geometric structures over all of the markable tiles is determined and compared to the median frequency or count of geometric structures over the other selected tiles. Thus, the frequencies of geometric structures is analyzed for half of the tiles, which are markable tiles (but may or may not be marked), and the other half of the tiles, which are known to be unmarked.

Embodiments of the invention can embed watermarks that encode a large number of bits into each reasonably sized block of a design within a routing step. The mark is robust against attacks and late design modifications (ECO) done with other systems. The mark can be detected and read successfully even if only minimum design data (i.e. only the design geometries) is available. The technique can be integrated within any traditional routing system that uses a cost driven approach and supports region specific costing for routing certain structures such as jogs and vias.

Embodiments of the invention provide methods for embedding watermarks into a layout of an IC-design using routing software. The watermarks encode information that includes a certain number of bits into the layout so that the marks are solely based on frequencies of geometric structures. The watermark can be generated exclusively based on the altered numbers of jogs in selected segments, exclusively based on the altered number of vias in the selected segments, or based on combinations of changes in the numbers of vias and jogs in the selected segments. Other geometric structures can also be used exclusively and in combination with one or more other geometric structures, such as vias and jogs, so that changes in selected segments form a watermark. The resulting marks can be detected only when geometries of the design are known. The marks are invisible and non-detectable without knowledge of a secret key and cannot be counterfeited without knowledge of a secret key. The marks are highly resistant against common changes of the design, such as an ECO step, even when such an ECO is made with different software or against large scale chip finishing procedures such as double cut via insertion. The marks are tamper resistant unless large parts of the design are redone with a different routing system or a general layout transformation system like compactors.

Further, embedding of the marks does neither affect significantly quality of routing nor the runtime. In addition to embedding a 0/1 indicator that the design has been marked, additional information can be encoded into the mark without affecting the encoding/decoding process. Thus, applications can on the fly decide how to use a certain number of free "data" bits and decoding will safely retrieve the content of these bits each time.

It should be understood that the embodiments described herein are not limited to the particular configurations disclosed, but cover all modifications, equivalents and alternatives falling within the scope of the appended claims. The preceding description has been presented with reference to illustrated embodiments. Persons skilled in the art will appreciate that alterations and changes in the described methods may be practiced without meaningfully departing from the principal, spirit and scope of embodiments. For example, embodiments can be applied to cases where a design is routed from scratch and frequency of geometric structures is utilized, cases where the frequency of geometric structures is changed by rerouting nets in a fully routed design, and in cases where unrouted nets in a partially routed design are routed and previously routed nets are re-routed in order to manipulate the frequency of geometric structures. Accordingly, the foregoing description should not be read as pertaining only to the precise methods described and illustrated in the accompanying drawings, but rather should be read consistent with and as support to the following claims which are to have their fullest and fair scope.

What is claimed is:

1. A computer implemented method for watermarking a circuit design layout, comprising:
dividing a circuit design layout into a plurality of segments;
selecting one or more segments from the plurality of segments; and
generating a watermark in the circuit design layout by altering, using a routing machine that comprises at least one processor, the number of geometric structures of the circuit design layout in the one or more segments that are selected.

2. The computer implemented method of claim 1, wherein the selected segments are randomly distributed.

3. The computer implemented method of claim 1, wherein the number of vias is altered to generate the watermark.

4. The computer implemented method of claim 1, wherein the number of jogs is altered to generate the watermark.

5. The computer implemented method of claim 1, wherein the number of vias and the number of jogs are altered to generate the watermark.

6. The computer implemented method of claim 1, wherein the number of geometric structures in the selected segments is altered by about 1-10% compared to the number of geometric structures in unselected segments.

7. The computer implemented method of claim 1, wherein the number of geometric structures in the selected segments is less than the number of geometric structures in unselected segments.

8. The computer implemented method of claim 1, wherein the number of geometric structures in the selected segments is greater than the number of geometric structures in unselected segments.

9. The computer implemented method of claim 1, wherein generating the watermark comprises modifying routing of the circuit design layout in each selected segments to alter the number of geometric structures in each selected segment.

10. The computer implemented method of claim 1, wherein all of the plurality of segments are the same shape.

11. The computer implemented method of claim 1, wherein the plurality of segments are squares, rectangles, triangles or a combination of two or more thereof.

12. The computer implemented method of claim 1, wherein the watermark is generated by selected segments that are grouped together.

13. The computer implemented method of claim 1, wherein the watermark is generated by selected segments that are separated from each other.

14. The computer implemented method of claim 1, wherein the watermark encodes a bit of data.

15. The computer implemented method of claim 1, wherein the watermark encodes a plurality of bits of data.

16. The computer implemented method of claim 15, wherein a first bit is encoded by a first set of selected segments, and a second bit is encoded by a second set of selected segments.

17. The computer implemented method of claim 16, wherein the first and second sets of selected segments are non-overlapping.

18. The computer implemented method of claim 16, wherein the first and second sets of selected segments are interlaced with each other.

19. The computer implemented method of claim 16, wherein a third bit is encoded by a third set of selected segments.

20. The computer implemented method of claim 19, wherein the third set of segments differs from the first and second set of segments.

21. The computer implemented method of claim 20, wherein the first, second and third sets of selected segments are non-overlapping.

22. The computer implemented method of claim 20, wherein the first, second and third sets of segments are interlaced with each other.

23. The computer implemented method of claim 1 being performed without accessing a netlist.

24. The computer implemented method of claim 1, wherein the watermark is based exclusively on the number of geometric structures in the selected segments.

25. The computer implemented method of claim 1, wherein the number of geometric structures in a selected segment of a selected layer of the circuit design layout is altered to form a three-dimensional watermark.

26. A computer implemented method for watermarking a circuit design layout, comprising:
dividing a circuit design layout into a plurality of segments;
selecting one or more segments from the plurality of segments; and
generating a watermark in the circuit design layout by modifying, using a routing machine that comprises at least one processor, routing of the circuit design layout to alter the number of vias in the circuit design layout in the one or more segments that are selected.

27. The computer implemented method of claim 26, wherein the selected segments are randomly distributed.

28. The computer implemented method of claim 26, wherein the number of vias in the selected segments is altered by about 1-10% compared to the number of vias in unselected segments.

29. The computer implemented method of claim 26, wherein the number of vias in the selected segments is less than the number of vias in unselected segments.

30. The computer implemented method of claim 26, wherein the number of vias in the selected segments is greater than the number of vias in unselected segments.

31. The computer implemented method of claim 26, wherein the watermark encodes a bit of data.

32. The computer implemented method of claim 26, wherein the watermark encodes a plurality of bits of data.

33. The computer implemented method of claim 32, wherein a first bit is encoded by a first set of selected segments, and a second bit is encoded by a second set of selected segments.

34. The computer implemented method of claim 33, wherein the first and second sets of selected segments are non-overlapping.

35. The computer implemented method of claim 33, wherein the first and second sets of selected segments are interlaced with each other.

36. The computer implemented method of claim 26 being performed without accessing a netlist.

37. The computer implemented method of claim 26, wherein the number of vias in a selected segment of a selected layer of the circuit design layout is altered to form a three-dimensional watermark.

38. A computer implemented method for watermarking a circuit design layout, comprising the steps of:
dividing a circuit design layout into a plurality of segments;
selecting one or more segments from the plurality of segments; and
generating a watermark in the circuit design layout by modifying, by using a routing machine that comprises at least one processor, routing of the circuit design layout to alter the number of jogs in the circuit design layout in the selected segments.

39. The computer implemented method of claim 38, wherein the selected segments are randomly distributed.

40. The computer implemented method of claim 38, wherein the number of jogs in the selected segments is altered by about 1-10% compared to the number of jogs in unselected segments.

41. The computer implemented method of claim 38, wherein the number of jogs in the selected segments is less than the number of jogs in unselected segments.

42. The computer implemented method of claim 38, wherein the number of jogs in the selected segments is greater than the number of jogs in unselected segments.

43. The computer implemented method of claim 38, wherein the watermark encodes a bit of data.

44. The computer implemented method of claim 38, wherein the watermark encodes a plurality of bits of data.

45. The computer implemented method of claim 44, wherein a first bit is encoded by a first set of selected segments, and a second bit is encoded by a second set of selected segments.

46. The computer implemented method of claim 45, wherein the first and second sets of selected segments are non-overlapping.

47. The computer implemented method of claim 45, wherein the first and second sets of selected segments are interlaced with each other.

48. The computer implemented method of claim 38 being performed without accessing a netlist.

49. A computer implemented method for watermarking a circuit design layout, comprising the steps of:
   dividing a circuit design layout into a plurality of segments;
   selecting one or more segments from the plurality of segments; and
   generating a watermark in the circuit design layout by altering, using a routing machine that comprises at least one processor, the gap between line ends in the selected segments.

* * * * *